US008301560B2

(12) United States Patent
Winslow et al.

(10) Patent No.: US 8,301,560 B2
(45) Date of Patent: *Oct. 30, 2012

(54) METHODS, SYSTEMS, AND COMPUTER READABLE MEDIA FOR FACILITATING THE EXCHANGE OF RECIPROCAL DEPOSITS

(75) Inventors: Kim B. Winslow, Manteo, NC (US); Adam Roark, Houston, TX (US); Dawn Bunch, Edenton, NC (US); Joseph Scheib, Raleigh, NC (US); Phillips Owen, Browns Summit, NC (US)

(73) Assignee: Anova Financial Corporation, Edenton, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/341,751

(22) Filed: Dec. 30, 2011

(65) Prior Publication Data

US 2012/0173404 A1    Jul. 5, 2012

Related U.S. Application Data

(63) Continuation of application No. 12/896,804, filed on Oct. 1, 2010, now Pat. No. 8,090,651, which is a continuation-in-part of application No. 10/569,013, filed as application No. PCT/US2004/027238 on Aug. 23, 2004, now Pat. No. 7,895,099, and a continuation-in-part of application No. 10/645,778, filed on Aug. 21, 2003, now Pat. No. 7,904,372.

(60) Provisional application No. 61/247,775, filed on Oct. 1, 2009.

(51) Int. Cl.
*G06Q 40/00* (2006.01)

(52) U.S. Cl. .......................................... 705/39; 705/37

(58) Field of Classification Search .................... 705/39, 705/37
See application file for complete search history.

(56) References Cited

U.S. PATENT DOCUMENTS

| 4,346,442 A | 8/1982 | Musmanno |
| 4,597,046 A | 6/1986 | Musmanno et al. |
| 4,751,640 A | 6/1988 | Lucas et al. |
| 4,774,663 A | 9/1988 | Musmanno et al. |
| 5,126,936 A | 6/1992 | Champion et al. |

(Continued)

FOREIGN PATENT DOCUMENTS

WO   WO 2005/022314 A2   3/2005

OTHER PUBLICATIONS

Notice of Allowance and Fee(s) Due for U.S. Appl. No. 12/896,804 (Oct. 31, 2011).

(Continued)

*Primary Examiner* — Thomas Dixon
*Assistant Examiner* — Benjamin S Fields
(74) *Attorney, Agent, or Firm* — Jenkins, Wilson, Taylor & Hunt, P.A.

(57) ABSTRACT

A control center receives, from the first bank, a first request with a first set of requirements for placement of reciprocal deposits. A second request with a second set of requirements is received from a second bank. The control center determines whether the first set of requirements matches the second set of requirements, which include maturity and interest rate. In response to a match, the control center performs an exchange of on-balance sheet deposits meeting the first set of requirements from the first bank to off-balance sheet deposits to the second bank. The first bank receives reciprocal deposits meeting the second set of requirements as new on-balance sheet deposits.

32 Claims, 8 Drawing Sheets

U.S. PATENT DOCUMENTS

| | | | |
|---|---|---|---|
| 5,262,942 | A | 11/1993 | Earle |
| 5,631,828 | A | 5/1997 | Hagan |
| 5,826,243 | A | 10/1998 | Musmanno et al. |
| 5,864,685 | A | 1/1999 | Hagan |
| 5,870,724 | A | 2/1999 | Lawlor et al. |
| 6,016,482 | A | 1/2000 | Molinari et al. |
| 6,052,673 | A | 4/2000 | Leon et al. |
| 6,192,347 | B1 | 2/2001 | Graff |
| 6,363,360 | B1 | 3/2002 | Madden |
| 6,374,231 | B1 | 4/2002 | Bent et al. |
| 6,513,020 | B1 | 1/2003 | Weiss et al. |
| 7,328,179 | B2 | 2/2008 | Sheehan et al. |
| 7,376,606 | B2 | 5/2008 | Jacobsen |
| 7,440,914 | B2 | 10/2008 | Jacobsen |
| 7,895,099 | B2 | 2/2011 | Whitting et al. |
| 7,904,372 | B2 | 3/2011 | Whitting et al. |
| 8,090,651 | B2 | 1/2012 | Winslow et al. |
| 2002/0046144 | A1 | 4/2002 | Graff |
| 2002/0069147 | A1 | 6/2002 | Sheehan et al. |
| 2002/0082981 | A1 | 6/2002 | Madden |
| 2002/0087454 | A1 | 7/2002 | Calo et al. |
| 2002/0188564 | A1 | 12/2002 | Star |
| 2002/0194099 | A1 | 12/2002 | Weiss |
| 2003/0023529 | A1 | 1/2003 | Jacobsen |
| 2003/0041003 | A1 | 2/2003 | Kayser, III |
| 2003/0135437 | A1 | 7/2003 | Jacobsen |
| 2003/0200174 | A1 | 10/2003 | Star |
| 2005/0044038 | A1 | 2/2005 | Whiting et al. |
| 2006/0212385 | A2 | 9/2006 | Bent et al. |
| 2007/0276752 | A1 | 11/2007 | Whiting et al. |
| 2011/0112962 | A1 | 5/2011 | Winslow et al. |

OTHER PUBLICATIONS

Notice of Allowance and Fee(s) Due for U.S. Appl. No. 10/645,778 (Oct. 20, 2010).

Office Communication for U.S. Appl. No. 10/569,013 (Oct. 14, 2010).

Notice of Allowance and Fee(s) Due for U.S. Appl. No. 10/569,013 (Oct. 13, 2010).

Commonly-assigned, co-pending U.S. Appl. No. 12/896,804 for "Methods, Systems, and Computer Readable Media for Facilitating the Exchange of Reciprocal Deposits."

Final Official Action for U.S. Appl. No. 10/645,778 (Mar. 30, 2010).

Final Official Action for U.S. Appl. No. 10/569,013 (Mar. 30, 2010).

Interview Summary for U.S. Appl. No. 10/645,778 (Mar. 29, 2010).

Interview Summary for U.S. Appl. No. 10/569,013 (Mar. 25, 2010).

Official Action for U.S. Appl. No. 10/569,013 (Aug. 20, 2009).

Official Action for U.S. Appl. No. 10/645,778 (Jul. 16, 2009).

Final Official Action for U.S. Appl. No. 10/645,778 (Jun. 4, 2009).

Final Official Action for U.S. Appl. No. 10/569,013 (May 27, 2009).

Interview Summary for U.S. Appl. No. 10/569,013 (Apr. 13, 2009).

Interview Summary for U.S. Appl. No. 10/645,778 (Apr. 13, 2009).

Federal Register, "Federal Deposit Insurance Corporation 12 CFR Part 327," vol. 74, No. 41, pp. 9525-9563 (Mar. 4, 2009).

Memo re:Final Rule on Risk-Based Assessments; Amended Restoration Plan; and Interim Rule on Emergency Special Assessment, pp. 1-15 (Feb. 26, 2009).

Notice of Non-Compliant Amendment for U.S. Appl. No. 10/569,013 (Dec. 22, 2008).

Official Action for U.S. Appl. No. 10/569,013 (Apr. 2, 2008).

Official Action for U.S. Appl. No. 10/645,778 (Mar. 31, 2008).

Garmhausen, Steve, "Matching Small Banks With Large Muni Deposits," Finistar Inc., Deposit-Brokering Service; Company Profile; Product/Service Evaluation, American Banker, p. 1A (Oct. 4, 2005).

Notification of Transmittal of the International Search Report and the Written Opinion of the International Searching Authority, or the Declaration for corresponding International Application No. PCT/US04/27238 (Apr. 28, 2005).

METHODS, SYSTEMS, AND COMPUTER READABLE MEDIA FOR FACILITATING THE EXCHANGE OF RECIPROCAL DEPOSITS

PRIORITY CLAIM

This application is a continuation of U.S. patent application Ser. No. 12/896,804 filed Oct. 1, 2010 (now U.S. Pat. No. 8,090,651), which claims the benefit of U.S. Provisional Patent Application Ser. No. 61/247,775, filed Oct. 1, 2009 and, which is a continuation-in-part of U.S. patent application Ser. No. 10/569,013, filed Sep. 5, 2006 (now U.S. Pat. No. 7,895,099), which is a national phase application of International Patent Application Serial Number PCT/US04/27238, filed Aug. 23, 2004, and is a continuation-in-part of U.S. patent application Ser. No. 10/645,778, filed Aug. 21, 2003 (now U.S. Pat. No. 7,904,372), the disclosures of which are incorporated by reference herein in their entireties.

TECHNICAL FIELD

The subject matter described herein relates to providing liquid deposit opportunities for pooled depositor groups and for providing deposit funds from the pooled depositor groups to commercial banks that the commercial banks may be permitted by regulatory authorities to count as stable deposits. More particularly, the subject matter described herein relates to methods, systems, and computer readable media for facilitating the exchange of reciprocal deposits.

BACKGROUND

Definitions

The following definitions apply to the corresponding terms used herein:

Certificate of deposit (CD): A certificate showing evidence of funds deposited for a specific period of time at a specific rate. The funds in a CD are not available for early withdrawal without specified penalties. CDs in excess of $250,000 are negotiable and are traded by dealers in money market investments.

Commercial bank: A bank chartered by a state or federal agency with the ability to receive time and demand deposits, to make commercial and mortgage loans, and to have insured deposits. In the United States, the deposits of a commercial bank are insured by the Federal Deposit Insurance Corporation (FDIC).

Control center: A point through which information flows for controlling transactions between commercial banks and pooled depositor groups is controlled.

Core deposit: A class of deposits deemed by an agency, such as the FDIC, to be stable (constant, minimum fluctuation in total amount, and available at a reasonable cost.)

Custodian: An entity, such as a bank, with the power granted by a state or federal agency to hold assets on behalf of a pooled depositor group or a commercial bank.

Hot funds: Funds available from a pooled depositor group for a short-term deposit or a specific transaction. A different rate may be negotiated for each transaction.

Master NOW account: A NOW account having a predetermined limit as to the total amount that can be deposited against the account. This limit may be determined by an agreement between the commercial bank posting the account and the control center.

NOW account: A negotiated order of withdrawal (NOW) account refers to an account with a commercial bank that permits unlimited activity with regard to deposits and withdrawals.

Off-balance sheet transaction: A transaction in which the bank of origination losses the deposits from its balance sheet.

On-balance sheet transaction: A transaction in which the bank of origination retains the full deposit amount on its balance sheet.

Pooled depositor group: A group of individuals or entities that pool funds for deposit purposes and that are permitted to deposit funds in a NOW account. Examples of pooled depositor groups include trust departments, pension funds, and government entities. Currently in the United States, commercial businesses are not permitted to deposit funds in a NOW account.

Reciprocal deposits: Deposits that an insured depository institution receives through a deposit placement network on a reciprocal basis, such that: (a) for any deposit received, the institution (as agent for depositors) places the same amount with other insured depository institutions through the network; and (b) each member of the network sets the interest rate to be paid on the entire amount of funds it places with other network members.

Stable funds: Pooled funds offered to commercial banks that preferably do not fluctuate significantly in amount as the interest rate changes.

Term funds: Funds available from a pooled depositor group offered to investment entities that need money for specified terms, such as 30 days, 60 days, 90 days, or 120 days. Conventionally, such funds have gone into CDs. However, community banks can pay higher rates for these funds because they are instant and avoid going to the brokerage CD market. Rates may be negotiated on individual transactions.

BACKGROUND

In the banking industry, it is desirable to maintain a certain percentage of core deposits. Core deposits are deposits that do not change significantly in amount with fluctuations in the interest rate paid on the deposits. Savings account deposits are one example of a bank's core deposits. In some circumstances a bank may seek out additional sources of funds. For example, banks often rely on non-core funding sources, such as brokered CDs. Brokered CDs are offered by a bank to retail customers through a deposit broker. Brokered CDs are less stable as a source of funds for banks than core deposits because depositors in brokered CDs are typically sensitive to interest rate fluctuations.

In the United States, the percentage of stable deposits affects the bank's ability to maintain a favorable regulatory rating. Core deposits are considered stable, but non-core deposits, including brokered deposits, are considered less stable. Thus, if a bank maintains too high of a percentage of non-core deposits, such as brokered deposits, the bank may be sanctioned by a regulatory agency such as the Federal Reserve for federally chartered banks or a state banking agency for state chartered banks. Yet another problem associated with using brokered deposits is that banks are required to pay a broker's commission for brokered deposits. Thus, banks desire access to stable funds.

Depositors, on the other hand, may desire an account from which funds can be easily deposited and withdrawn, a characteristic referred to as liquidity, and desire that such an account also provide insurance in the event of bank failure. In the United States, the FDIC provides such insurance, but only up to $250,000 per individual per bank.

Pooled depositor groups, such as trust departments, pension funds, government entities, insurance companies, and any entities that are allowed to make deposits into a negotiated order of withdrawal (NOW) account, are constantly looking for safe, insured deposit vehicles for their funds. In addition, it is desirable for individual depositors in a pooled depositor group to be able to access funds without penalty on a short-term basis.

Conventionally, pooled depositor groups have invested in money market funds. However, investing in money market funds is undesirable because money market funds have historically paid low interest rates. Certificates of deposit are undesirable because money is not accessible on a short-term basis without paying a penalty. As a result, in order to fully insure a depositor's funds, a trust department is required to divide a depositor's assets in excess of $250,000 among multiple banks. Accordingly, in light of these difficulties associated with conventional cash management vehicles, there exists a need for an insured or collateralized deposit vehicle for pooled depositor groups.

Other entities, such as individual depositors (including corporations and human beings) may also seek insured, liquid deposit opportunities for their funds. These entities face the same difficulties as those described above for pooled depositor groups. Accordingly, there exists a need for an insured or collateralized deposit vehicle for individual depositors.

Yet another problem that exists in financial transactions is unrelated to insurance. It may be desirable to provide a method for depositors to spread deposits among multiple commercial banks for security reasons. For example, it may be desirable for depositors to deposit funds in commercial banks in different countries to avoid risks associated with economic and political instability. Currently there is no efficient system for matching depositors' deposit needs to commercial banks' cash flow needs when the banks are located in different countries.

Accordingly, there exists a long felt need for improved methods and systems for allowing depositors to distribute deposits among commercial banks while at the same time providing banks with funds that are considered stable enough to avoid sanctions from regulatory agencies.

SUMMARY

According to one aspect, the subject matter described herein includes a system for facilitating the exchange of reciprocal deposits. The system includes a first bank for participating in an exchange of reciprocal deposits and a control center for implementing an exchange of reciprocal deposits between the first bank and a second bank for receiving deposits. The control center is configured to receive, from the first bank, a first request for placement of reciprocal deposits, the request defining a first set of requirements, and receive, from the second bank, a second request for placement of reciprocal deposits, the request defining a second set of requirements. The control center determines whether the first set of requirements matches the second set of requirements, which include maturity and interest rate. In response to determining that the first set of requirements matches the second set of requirements, the control center performs an exchange of on-balance sheet deposits meeting the first set of requirements from the first bank to off-balance sheet deposits to the second bank. The first bank receives reciprocal deposits meeting the second set of requirements as new on-balance sheet deposits. The reciprocal deposits may come from the second bank or from an entity other than the first and second bank, such as a depositor.

According to another aspect, the subject matter described herein includes a method for facilitating the exchange of reciprocal deposits. The method includes receiving, from a first bank of origination, a first request for placement of reciprocal deposits, and receiving, from a second bank of origination, a second request for placement of reciprocal deposits, the first and second requests each specifying an amount of reciprocal deposits and an interest rate. It is determined whether the amount of reciprocal deposits from the first request matches the amount of reciprocal deposits from the second request. In response to determining that the amount of reciprocal deposits from the first request matches the amount of reciprocal deposits from the second request, an exchange of reciprocal deposits is performed, in which on-balance sheet deposits in the amount from the first request from the first bank of origination is exchanged for off-balance sheet deposits to the second bank of origination, and reciprocal deposits in the amount from the second request to the first bank of origination are received by the first bank of origination as new on-balance sheet deposits.

According to yet another aspect, the subject matter described herein includes a method for facilitating the exchange of reciprocal deposits. The method includes receiving, from a first bank of origination, a first request for placement of reciprocal deposits, and receiving, from a second bank of origination, a second request for placement of reciprocal deposits, the first and second requests each specifying a maturity and an interest rate. It is determined whether maturity and interest rate from the first request matches the maturity and interest rate from the second request. In response to determining that the maturity and interest rate from the first request matches the maturity and interest rate from the second request, an exchange of reciprocal deposits is performed, in which on-balance sheet deposits in the amount from the first request from the first bank of origination is exchanged for off-balance sheet deposits to the second bank of origination, and reciprocal deposits in the amount from the second request to the first bank of origination are received by the first bank of origination as new on-balance sheet deposits.

The subject matter described herein for methods, systems, and computer readable media for facilitating the exchange of reciprocal deposits may be implemented in hardware, which may additionally include software and/or firmware. As such, the terms "function" or "module" as used herein refer to hardware, which may also include software and/or firmware components, for implementing the feature being described. In one exemplary implementation, the subject matter described herein may be implemented using a non-transitory computer readable medium having stored thereon computer executable instructions that when executed by the processor of a computer control the computer to perform steps. Exemplary non-transitory computer readable media suitable for implementing the subject matter described herein include, but are not limited to, disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the invention will now be explained with reference to the accompanying drawings, wherein like reference numerals represent like parts, of which.

DETAILED DESCRIPTION

Figure 1:
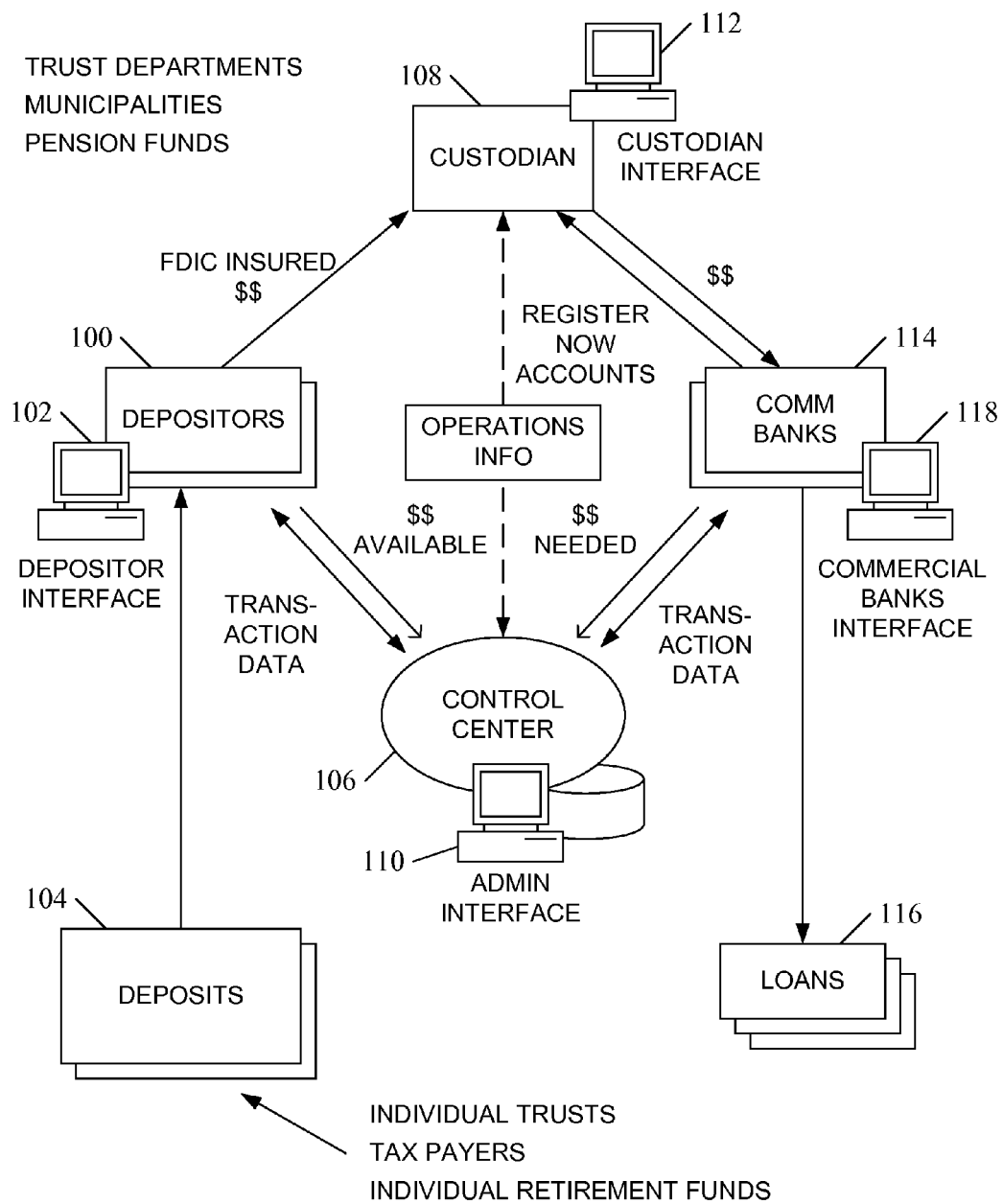
FIG. 1 illustrates an exemplary system for facilitating the exchange of reciprocal deposits according to an embodiment of the subject matter described herein.

Under the Feb. 26, 2009 FDIC Final Rule on Risk-Based Assessments and Mar. 4, 2009 FDIC 12 CFR Part 327 RIN 3064-AD35 Assessments (hereinafter collectively referred to as "the Final Rules"), reciprocal deposits are treated differently than other brokered deposits for assessment purposes. Because the FDIC recognizes that reciprocal deposits as defined may be a more stable source of funding for healthy banks than other types of brokered deposits and that they may not be as readily used to fund rapid asset growth, reciprocal deposits are not included in the "broker deposit adjustment" applicable to institutions in Risk Category I. (Reciprocal deposits are included in the "brokered deposit adjustment" applicable to institutions in Risk Category II, III, and IV, however.)

For Risk Category I, the Final Rules introduce a new financial ratio into the financial ratios method. This new ratio will capture certain brokered deposits (in excess of 10 percent of domestic deposits) that are used to fund rapid asset growth. The new financial ratio in the Final Rules differs from the previously proposed rule in several respects. The new financial ratio excludes deposits that an insured depository institution receives through a deposit placement network on a reciprocal basis, such that: (1) for any deposit received, the institution (as agent for depositors) places the same amount with other insured depository institutions through the network; and (2) each member of the network sets the interest rate to be paid on the entire amount of funds it places with other network members (i.e., reciprocal deposits.) The new financial ratio also raises the asset growth threshold compared to the previously proposed rule. The Final Rules also update the uniform amount and the pricing multipliers for the weighted average CAMELS (the adequacy of Capital, the quality of Assets, the capability of Management, the quality and level of Earnings and the adequacy of Liquidity) component ratings and financial ratios.

Thus, reciprocal deposits are an attractive source of funding for banks, because of their stability and preferential treatment by the FDIC, and are attractive also to depositors, because of their liquidity and the increased FDIC insurance that they afford.

In order to address the aforementioned problems associated with providing cash to commercial banks and providing insured, liquid deposit opportunities for pooled depositor groups and individual depositors, and furthermore to take advantage of the benefits of reciprocal deposits over traditional brokered deposits, one embodiment of the subject matter described herein includes a reciprocal exchange deposit program (REDP) for providing an exchange of reciprocal deposits between participating Risk Category I insured depository institutions such that deposits received through this REDP program are exempt from the "brokered deposit adjustment" as defined in the Final Rules.

In one embodiment, a REDP program provided by ANOVA Financial Corporation is detailed as follows:

1. Each Risk Category I participating insured depository institution ("bank of origination") acts as agent for its deposit customers and agrees to place deposits on behalf of its deposit customer through ANOVA, as a third party agent, and a custodial bank, as third party custodian, such that these deposits are removed from the bank of origination's balance sheet and are Fed wired or automated clearing house (ACH) transferred to other Risk Category I REDP network participating insured depository institutions ("Demand Banks") into a REDP-segregated Master MMDA account for non-public depositors, or a REDP-segregated Master NOW account for public depositors, at each Demand Bank such that the deposit customer can obtain FDIC insurance coverage beyond FDIC limits (currently $250,000 per account) available at a single insured institution.

2. Each REDP network participating bank sets a monthly fixed interest rate to be paid for that calendar month to its deposit customers by the other REDP network participating banks which are allocated the funds of its deposit customer.

3. The bank of origination as agent for the deposit customer agrees to receive deposits of an equal amount from one or more other REDP network participating banks such that these deposits are on the receiving bank's balance sheet as "Reciprocal Deposits" that for assessment purposes are not included in the "broker deposit adjustment" applicable to institutions in Risk Category I.

4. Monthly the REDP network participating bank resets the monthly fixed interest rate to be paid for that calendar month and the other participating banks either agree to the new monthly interest rate or decline the new rate and funds are reallocated to other participating network banks who have accepted the new interest rate.

FIG. 1 illustrates a system for facilitating the exchange of reciprocal deposits according to an embodiment of the subject matter described herein. In FIG. 1, block 100 represents pooled depositor groups that have available cash to invest in insured, liquid deposit opportunities. In one embodiment, a depositor interface 102 is provided for these groups to access insured, liquid deposit opportunities created based on cash needed by commercial banks for stable deposits. The funds that pooled depositor groups 100 have available for deposit may originate from deposits, represented by block 104. The deposits may be from individual trusts, taxpayers, retirement funds, or other suitable cash source.

In one embodiment, the system includes a control center 106, which may be a server or computer hardware. On control center 106 may reside a highly flexible allocation model (software) driven by a matrix of parameters representing investors' properties, account types, government regulations, geographical limits, applies business rules, reconciles pending transactions against existing databases (i.e. bank holding reports), and a decision tree which solves equations that enable the matching the supply of funds with demand for such funds in real time. One example of such a model is ANOVA Corporation's Parametric Model for Allocation of Investment Funds (PAMAIF)®.

PAMAIF® is an allocation method that utilizes various business rules for various types of depositors, such as individuals, joint accounts, corporations, pension funds with pass-through insurance, local governments and public authorities where funds must stay in state, individual retirement accounts, non-profits, treasury service for banks, and trusts/fiduciaries.

PAMAIF® utilizes a matrix to match pending deposits segregated by deposit type, which may include, but are not limited to, NOW accounts, money market deposit accounts (MMDAs), REDP-NOW, REDP-MMDA, laddered certificates of deposit, etc., and allocates these deposits to match bank demand for these segregated deposits. In one embodiment, an auction capability may implement a daily or periodic auction where the banks that have the highest appetite on that given day will have the opportunity to participate in an auction and bid for the deposits available.

A custodian 108 may be provided as a trusted intermediary through which pooled depositor groups 100 may make their deposit cash available. In one example, custodian 108 may be a known financial institution, such as a national bank. However, the subject matter described herein is not limited to using a custodian to facilitate transactions between commercial banks and pooled depositor groups. In one implementation, custodian 108 may be omitted and control center 106 may function as a custodian for the commercial banks and the pooled depositor groups.

In the illustrated example, both control center 106 and custodian 108 include software interfaces 110 and 112. Software interface 110 at control center 106 allows control center 110 to view transactions made through custodian 108. Custodian interface 112 allows custodian 108 to view accounts and transfer cash to and from the accounts.

On the right hand side of the diagram, commercial banks 114 may need cash for core deposits to cover loans 116. Alternatively, or in addition, banks 114 may need term funds or hot funds. In order to obtain needed funds, banks 114 register with control center 106 and post master NOW accounts with custodian 108. Commercial banks software interface 118 allows banks to post to master NOW accounts and notifies banks 114 of the interest rate to be paid on cash obtained by banks 114 from custodian 108.

In order to provide an insured, liquid deposit opportunity for depositors 100 and cash to banks 114, an interest rate that is attractive to both depositors 100 and commercial banks 114 must be determined. In one embodiment of the invention, depositors 100 are offered a first interest rate, and commercial banks pay a second interest rate, where the second interest rate is higher than the first interest rate. The owners of control center 106 may be able to obtain favorable interest rates from commercial banks 114 by aggregating cash from multiple pooled depositor groups. Based on the difference in interest rates, the owners of control center 106 may fund operations and preferably make a profit. Once the interest rates are set, control center 106 communicates the first interest rate to depositors 100 via depositor interface 102 and communicates the second interest rate to banks 114 via commercial banks interface 118. Both interest rates are preferably guaranteed for a fixed term, such as one month. In addition, depositors 100 are preferably allowed to withdraw cash deposited without penalty in predetermined amounts at predetermined time intervals. For example, the cash deposited by depositors 100 may be made available without penalty to the depositors in denominations of $1 on a daily basis.

In order to qualify for preferred treatment by regulatory agencies such as the FDIC, the reciprocal exchange deposit program implemented by the system illustrated in FIG. 1 provides the option for a participating commercial bank 114 to receive reciprocal deposits on a dollar for dollar basis back from other depositors 100 and/or banks 114 to offset the loss of funds to the bank of origination's balance sheet. In this instance the bank of origination is exchanging on-balance sheet deposits from its existing depositors to off-balance sheet receiving banks, but also receiving new reciprocal deposits back to the bank of origination as on-balance sheet new deposits.

Thus, the system illustrated in FIG. 1 may be characterized as a deposit broker that matches a supply of deposits with demand for those deposits and earning a higher yield for the depositor as a result of aggregating the deposits and providing a lower cost of funds to the receiving banks through a net transaction technology.

The subject matter described herein is not limited to offering different interest rates to depositors 100 than commercial banks 114 are willing to pay. In an alternate implementation of the invention, the rate offered by commercial banks 114 may be the same rate that is provided to depositors 100. In return for providing access to aggregate depositors 100, commercial banks 114 may pay the owners of control center 106 a predetermined commission or fee. Thus, by facilitating transactions between depositors and commercial banks, control centers 106 may be able to provide better interest rates on deposits, provide cash to commercial banks, and may do so in a manner that earns a profit.

Thus, in one embodiment, the system operates as a deposit broker and exchanges similar products, i.e., products having no maturity and having the same interest rates, on a supply versus demand basis. Control center 106 sets the rates for both the depositor and the receiving banks and allocates deposits from depositors seeking FDIC insurance, liquidity, and aggregated higher yield, e.g., depositors who have established accounts via control center 106 to commercial banks 114 seeking a lower cost wholesale funding source that has daily liquidity. The owners of control center 106 may earn fees from the difference in the interest spread—i.e., the difference between the rate of interest paid to depositors and the rate of interest charged to the receiving banks. Such transactions are off-balance sheet transactions in which the bank of origination losses the deposits from its balance sheet. In the United States, this kind of operation is classified by the FDIC as a deposit broker service (depositor-to-bank service).

In contrast to the subject matter described herein, one conventional solution for satisfying the conflicting needs of banks, which desire core funds, and depositors, which desire liquidity and insurance protection, are systems which calculate the differences in maturity and interest rates between unaffiliated banks who set their own rates and which solve via a Present Value solution the exchange of these deposits between these unaffiliated banks. CDs are used as the primary certified deposit so that dissimilar deposits may be "purchased" on an exchange basis. While banks may benefit from the relatively stable nature of CDs, most CDs impose a penalty for withdrawal before maturity and are therefore not attractive to depositors that are looking for liquidity. Another disadvantage to these kinds of conventional systems is that they transform or convert dissimilar deposit products (different maturities and interest rates) and earn a fee for this processing service. This conventional approach is an on-balance sheet solution where the bank of origination retains the full deposit amount on its balance sheet. In the United States, this kind of operation is classified by the FDIC as an interbank deposit placement service (bank to bank service).

The system illustrated in FIG. 1 overcomes the disadvantages of conventional systems as described above and provide a convenient deposit vehicle for commercial banks to obtain stable money for core deposits and term funds. As a result of participation in the reciprocal exchange deposit program described herein, commercial banks 114 can reduce their percentages of hot funds brokered deposits and thereby increase the likelihood of a favorable regulatory rating. In addition, the system and software illustrated in FIG. 1 provides a convenient liquid deposit opportunity for depositors. Thus, the system illustrated in FIG. 1 facilitates the exchange of reciprocal deposits. In one exemplary method, banks and depositors register with a control center. Control center employees may solicit deposit cash from different depositors and aggregate the deposit cash of the multiple pooled depositor groups to produce a stable source of funds. Alternatively, if a single depositor has a large amount of excess cash that the entity is willing to deposit, aggregation of cash from different sources may not be required. The control center may then notify banks of the stable source of funds and inquire as to the interest rate that banks are willing to pay for the stable source of funds.

In order to receive funds from the stable source of funds, a bank will post a deposit account with an appointed custodian. For government entities, trust departments, pension funds, and non-profit organizations, the deposit account may be a master NOW account. For other entities, such as individuals (including human beings or corporations), the deposit account may be a MMDA or other time or interest bearing deposit accounts. The control center sets an interest rate to be paid on the deposit accounts based on the rate that the bank is willing to pay for all or a portion of the stable funds source and the rate of return that the depositors expect on their deposits. The control center notifies the depositors of the availability of the deposit account at the specified interest rate. The depositor then deposits funds in the deposit account. The control center monitors transactions between the depositors and the custodian and between the custodian and the banks and generates reports.

Because the control center can aggregate deposit funds of multiple pooled depositor groups, the pooled depositor groups should be able to offer a stable source of funds to commercial banks. As a result, banks are permitted to treat the funds received from the pooled depositor groups as stable deposits. In addition, money deposited in the master NOW accounts are FDIC insured up to $250,000 for any single depositor within the pooled depositor group. Through the control center, funds in excess of $250,000 to any single depositor are deposited in separate banks to insure FDIC coverage or the banking institution collateralizes the funds in excess of $250,000. However, by using a master NOW account, funds from a depositor group in excess of $250,000 can be fully insured provided that funds from individual depositors within the group do not exceed $250,000, as per a recent statement from the FDIC. Thus, if a depositor group of 100 depositors with $50,000 each deposits funds in a master NOW account with a single bank, the entire amount will be FDIC insured.

Another advantage of using master NOW accounts is that depositors are allowed to withdraw money from a master NOW account on a daily basis without penalty. As a result, using master NOW accounts provides a liquidity advantage over conventional certificates of deposit.

As indicated above, the custodian's duties are to hold assets on behalf of pooled depositor groups and commercial banks. In addition custodians may have the following duties:

1. Establish a custody account for the control center in which the following transactions will be reflected.
2. Within the custody account, establish an asset record for each commercial bank master NOW account. The asset amount will reflect the total deposit by all depositors in each NOW account. The control center will provide instructions regarding the setup of new NOW accounts within a reasonable period of time prior to the funding of particular NOW accounts.
3. Receive funds transfers, such as federal wire transfers and automated clearing house transfers, on a daily basis from various depositors who have signed agreements with the control center. The funds must be received within a reasonable period of time to be invested on the same day.
4. In conjunction with each incoming wire, accept written direction from the control center (e.g., by fax or e-mail) with regard to the application of funds. Direction must be received within a reasonable period of time for same-day deposit and will include the amount to be received and the name of the bank to which funds will be wired (for deposit-purchase into the selected NOW account). If volumes increase dramatically, the deadline for directions may be changed to an earlier time.
5. Wire funds received within a reasonable period of time from depositors to various commercial banks on a daily basis, as instructed by the control center, before the close of business on the day the funds are received.
6. Reconcile holdings in the custody account to statements received from NOW account issuers (commercial banks).
7. As earnings are added to NOW accounts each month, post the addition of those earnings to each NOW account held in the custody account in order to bring the custody account holdings current with issuing commercial bank records.
8. As depositors request funds, withdraw principal from various NOW accounts on a daily basis (e.g., via funds wires) as instructed by the control center.
9. Wire withdrawn monies back to depositors on a daily basis as instructed by the control center.
10. Once a month, receive by wire an earnings spread on the NOW accounts from each issuing commercial bank and wire to the control center the earnings spread minus the custodian fee. The earnings spread will be determined on each NOW account by the control center. The control center may choose a different method for distribution: the earnings spread may be wired directly to the control center by the issuing commercial bank, rather than through the custodian. If this method of payment is chosen, the custodian will send a monthly invoice to the control center, which will be paid within 30 days of receipt.

Example Transaction

As discussed above, the subject matter described herein facilitates transactions between pooled depositor groups 100 and commercial banks 114 by providing a convenient software interface for these groups to perform financial transactions. In one exemplary transaction, a commercial bank may register with control center 106 by accessing a registration web page provided by control center 106 and providing information that may be used by control center 106 to qualify the entity as a commercial bank. Once control center 106 qualifies the entity as a commercial bank, control center 106 provides a NOW account agreement to the commercial bank. Once the NOW account agreement is executed, control center 106 provides the commercial bank with a password and login ID to access a personalized commercial banks interface 118. The commercial bank uses commercial banks interface 118 to define its business rules and communicate deposit needs to custodian 108.

A depositor seeking to provide funds for deposit purposes accesses the registration web page provided by control center 106 and provides information usable by control center 106 to qualify the depositor. As discussed above, a pooled depositor group may be any group that is permitted to deposit funds in a NOW account. Such groups include municipalities, trust departments, pension funds, or any other group that can invest in a NOW account. Control center 106 also enters a deposit agreement with the depositor group. Once the agreement has been executed, control center 106 provides the depositor group with a password and login ID.

Once the depositor group receives its password and login ID, the depositor group accesses depositor interface 102 using the password and login ID and customizes the depositor interface to meet the depositor's business needs. For example, customizing the interface may include defining business rules associated with the particular depositor and specifying an amount of funds available for deposit. One particular business rule that the depositor may define includes whether or not all funds of all depositors are to be FDIC insured.

In order to deposit money, the depositor accesses depositor interface 102 and receives, in real time, the amount of money needed collectively by commercial banks 114 and the interest rate currently being paid for the money. If the interest rate is agreeable to the depositor group, the depositor group inputs information as to the amount of funds to be deposited, sub-accounting information, and when the funds are to be made available. This information is provided to control center 106. Control center 106 provides the sub-accounting information to custodian 108. Control center 106 also provides wiring instructions for the depositor group to transfer the money to custodian 108. Control center 106 informs custodian 108 to post the funds in a particular master NOW account. Custodian 108 may notify the commercial banks whose NOW accounts are being affected of the incoming cash. Control center 106 preferably also provides instructions to custodian 108 as to which banks to wire the funds.

As indicated above, the system illustrated in FIG. 1 preferably allows depositors 100 to withdraw funds deposited in a master NOW account on a daily basis without penalty. One method for withdrawing funds includes identifying the bank in which a particular depositor's funds are deposited and providing wiring instructions for the bank to wire the requested funds to be withdrawn to custodian 108 and wiring the funds from custodian 108 to the requesting depositor group. While this method works, it is expensive due to the wiring transaction fees involved in delivering the funds from commercial banks 114, to custodian 108, and to depositors 100. In addition, this method unnecessarily displaces cash currently held by banks 114.

In order to reduce transaction expenses associated withdrawals and to reduce displacement of cash held by commercial banks, custodian 108 may identify incoming deposits and withdrawal requests from depositors 100 on a given day, and, rather than requesting funds from a bank to satisfy withdrawal requests and then providing funds to the bank from an incoming deposit, custodian 108 may satisfy a withdrawal request from one depositor group using incoming funds from another depositor group. When this occurs, custodian 108 may simply update its accounting records so that ownership of the deposited funds of the depositor group requesting the withdrawal is changed to reflect that the depositor group whose incoming funds were used to satisfy the withdrawal is now the owner of the deposited funds. For example, if depositor group A requests a $50,000 withdrawal and depositor group B simultaneously deposits $250,000, custodian 108 may satisfy depositor group A's withdrawal request with $50,000 of depositor group B's incoming funds. Custodian 108 then updates its accounting records so that $50,000 of depositor group A's funds deposited in a particular NOW account are now owned by depositor group B. The remaining incoming funds from depositor group B may then be deposited in any master NOW account posted by commercial banks 114. By satisfying incoming withdrawal requests with incoming funds, custodian 108 reduces transaction fees and increases the depositor's return.

Although the methods and systems described above relate primarily to providing a convenient interface for pooled depositor groups and commercial banks that allows the pooled depositor groups to have a liquid, fully insured deposit, the subject matter described herein is not limited to such an embodiment. In an alternate embodiment, depositors 100 illustrated in FIG. 1 may desire to deposit funds in multiple commercial banks for other reasons, such as security reasons. For example, depositors 100 may desire to deposit funds in commercial banks in multiple countries to reduce risks related to political or economic instability in the individual countries. In such an embodiment, commercial banks interface 118 may receive account postings from banks in different individual countries and may post the accounts with custodian 108. Depositors 100 may view the account postings via depositor interface 102 and select banks in different countries with which to deposit money based on the account postings. Control center 106 may then complete the transaction between the depositor and the individual banks selected by the depositor. Thus, the subject matter described herein may also be used to reduce the risk of depositing funds in banks in individual countries.

The methods and systems described above may also be utilized to allow the owners of control center 106 to auction funds to commercial banks. For example, if demand for cash deposits exceeds supply, the owners of control center 106 may auction funds to commercial banks in order to obtain a higher rate of return for depositors, a higher fee for providing access to a stable funds source, or both.

Thus, as described above, the subject matter described herein provides a convenient software interface for facilitating transactions between commercial banks and pooled depositor groups. The software interface may be implemented as web pages displayed to a custodian, pooled depositor groups, commercial banks, and an administrator. By aggregating deposit needs of multiple pooled depositor groups, the control center produces a stable source of funds for commercial banks that the commercial banks can consider as core deposits. In addition, because of the stable nature and volume of such funds, the commercial banks may be willing to pay a higher interest rate than the pooled depositor groups expect. As a result, the owners of the control center can generate revenue for facilitating the transactions.

Figure 2:
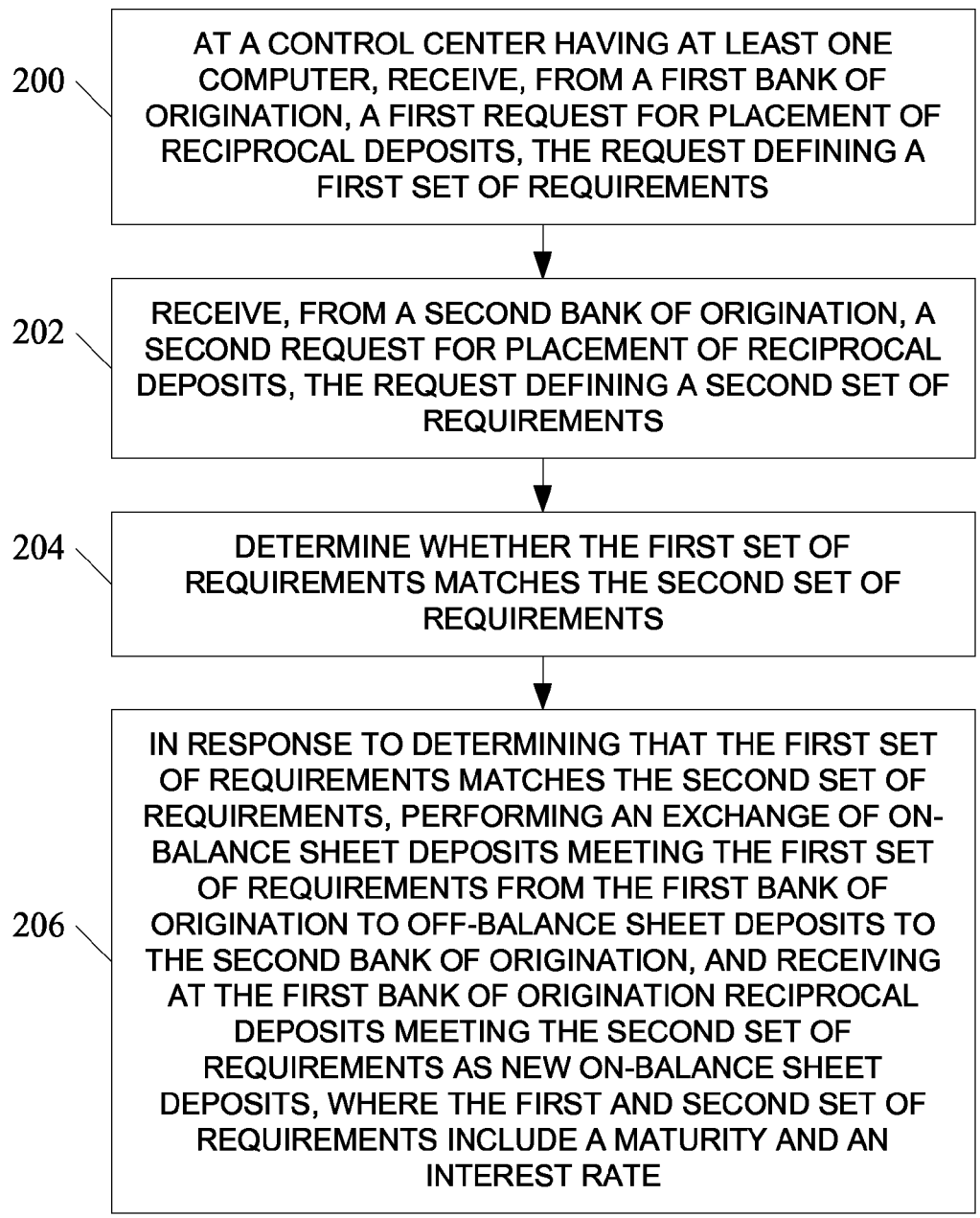
FIG. 2 is a flow chart illustrating an exemplary process for facilitating the exchange of reciprocal deposits according to an embodiment of the subject matter described herein.

FIG. 2 is a flow chart illustrating an exemplary process for facilitating the exchange of reciprocal deposits according to an embodiment of the subject matter described herein. This process will now be described with reference to FIGS. 1 and 2.

At block 200, at a control center having at least one computer, a first request for placement of reciprocal deposits is received from a first bank of origination, the request defining a first set of requirements. At block 202, a second request for placement of reciprocal deposits is received from a second bank of origination, the request defining a first set of requirements. For example, in the embodiment illustrated in FIG. 1, control center 106 may receive requests from a commercial bank 114 and a depositor 100, or from two commercial banks 114.

At block 204, it is determined whether the first set of requirements matches the second set of requirements. In one embodiment, each set of requirements may specify a maturity (or that there is no maturity) and an interest rate. In an alternative embodiment, each set of requirements may also specify an amount of deposit. Other requirements may also be specified.

At block 206, in response to determining that the first set of requirements matches the second set of requirements, e.g., having the same maturity and interest rate, the same amount, etc., an exchange of on-balance sheet deposits is performed in the amount from the first request from the first bank of origination to off-balance sheet deposits to the second bank of origination, and reciprocal deposits are received in the amount from the second request to the first bank of origination as new on-balance sheet deposits. For example, control center 106 may initiate an exchange of reciprocal deposits between two or more of the commercial banks 114.

Figure 3A:
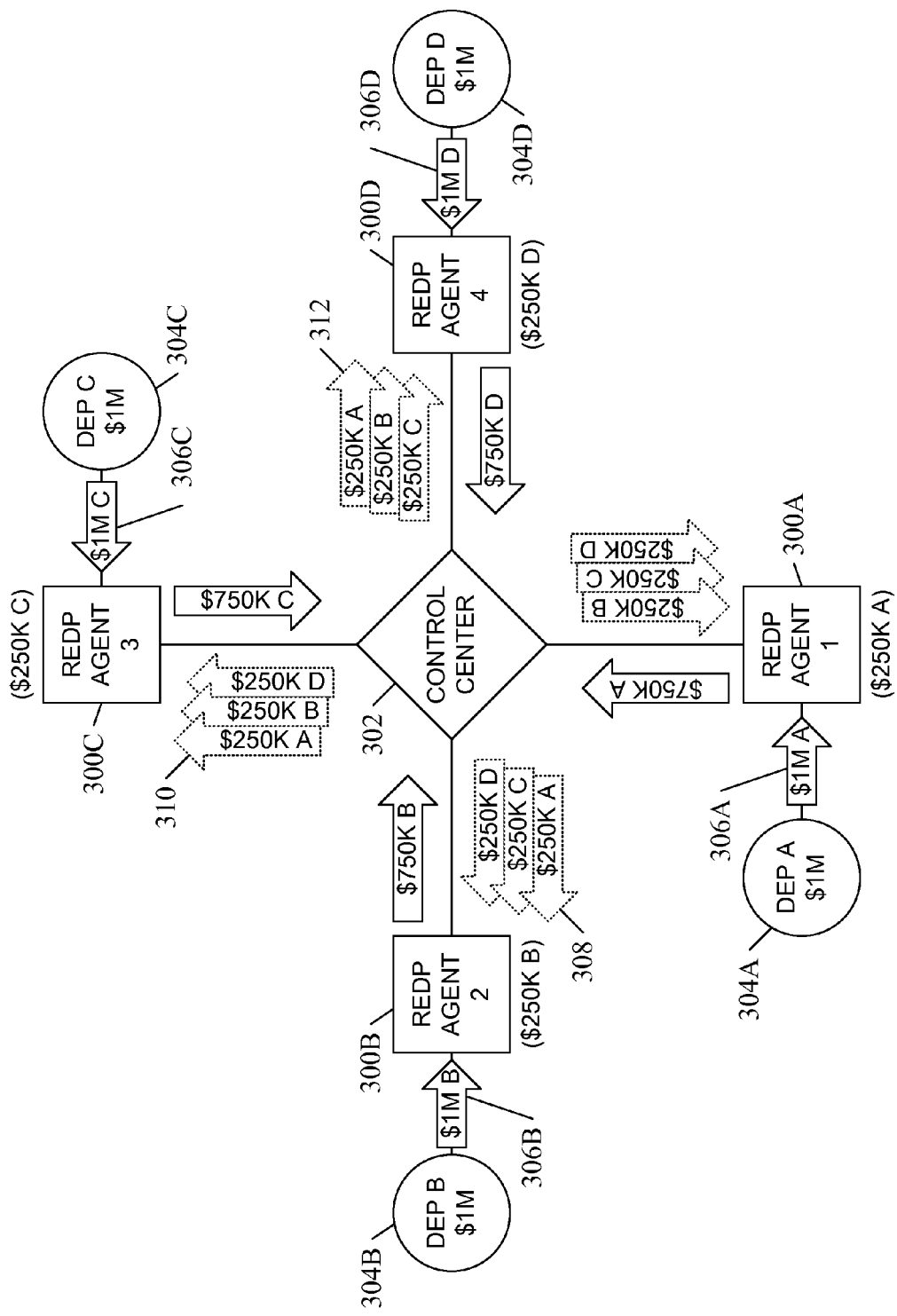
FIGS. 3A-3C illustrate an exemplary system and method for facilitating the exchange of reciprocal deposits according to embodiments of the subject matter described herein.
Figure 3B:
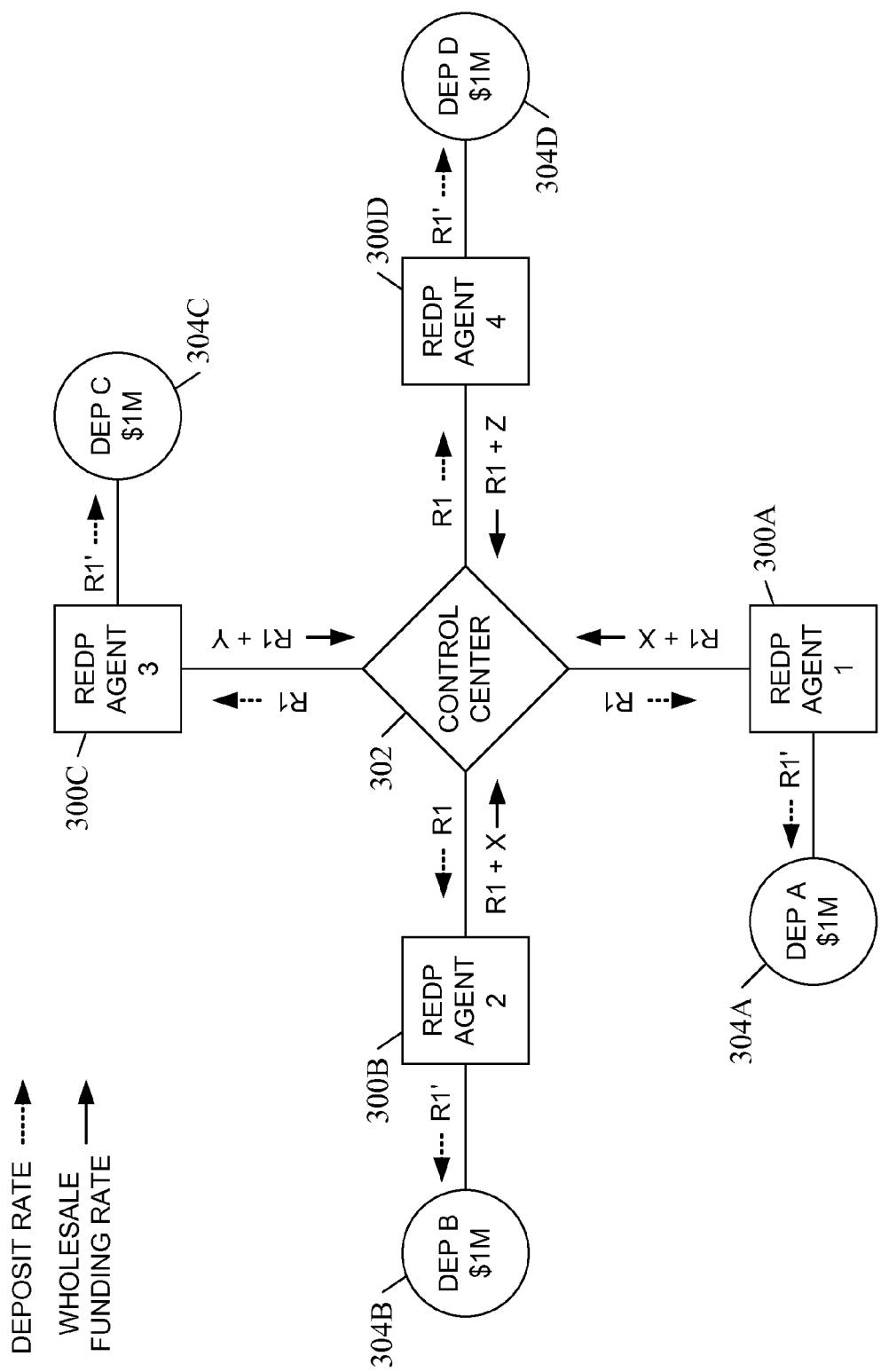
Figure 3C:
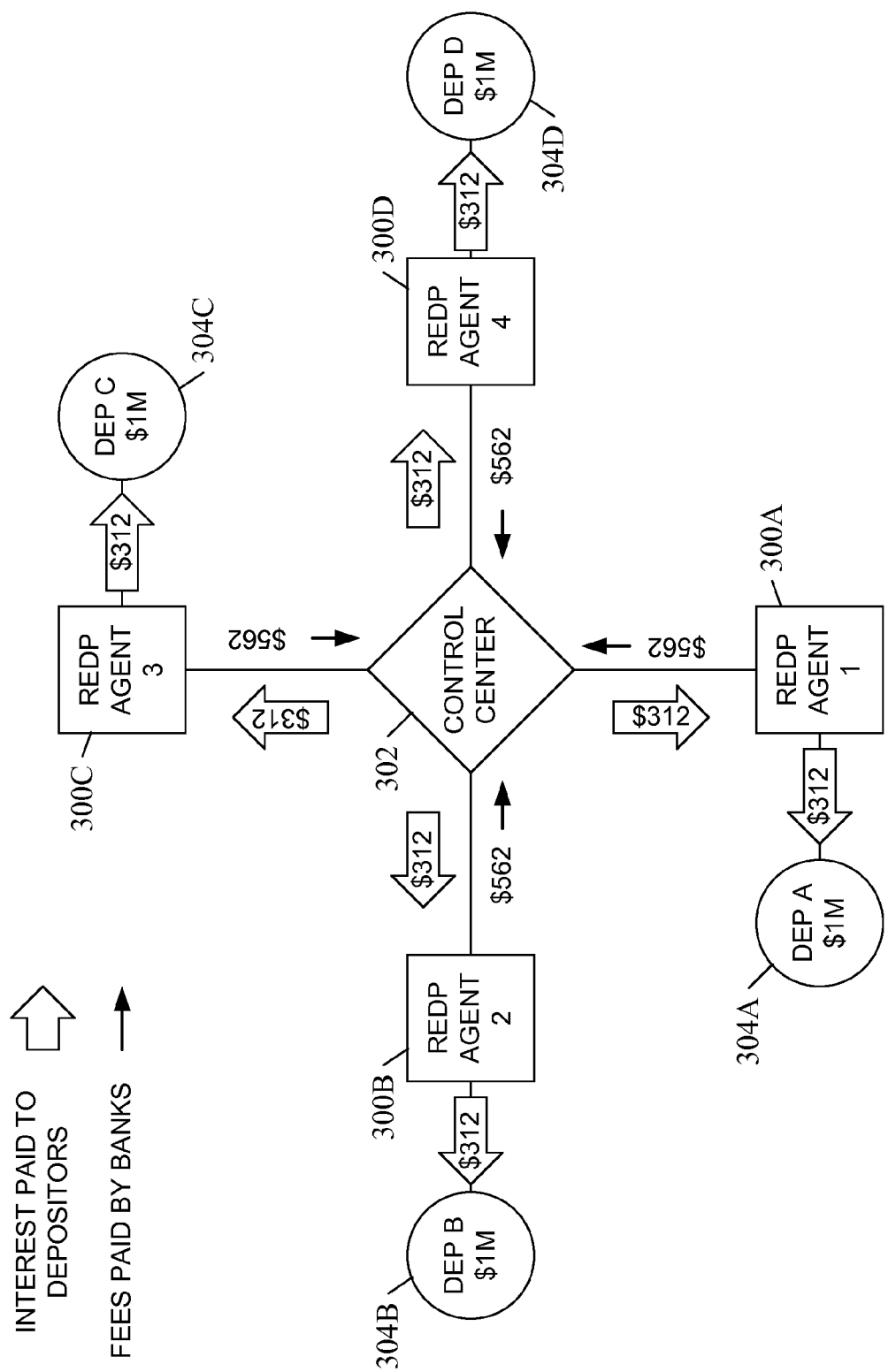

FIGS. 3A-3C illustrate an exemplary system and method for facilitating the exchange of reciprocal deposits according to embodiments of the subject matter described herein. Banks that participate in a reciprocal exchange deposit program are referred to as "REDP agents" or simply "agents". FIGS. 3A-3C illustrate a system in which participating banks that receive funds also contribute funds, herein referred to as a "closed loop" model.

FIG. 3A illustrates an exchange of reciprocal deposits in an exemplary reciprocal exchange deposit program according to one embodiment of the subject matter described herein. In the embodiment illustrated in FIG. 3A, four banks, labeled 300A, 300B, 300C, and 300D, are REDP agents 1 through 4, respectively, and are participating in an reciprocal exchange program controlled by control center 302. Each bank is acting on behalf of a depositor: bank 300A is acting on behalf of depositor A 304A, bank 300B is acting on behalf of depositor B 304B, bank 300C is acting on behalf of depositor C 304C, and bank 300D is acting on behalf of depositor D 304D. In the embodiment illustrated in FIG. 3A, deposits of funds into control center 302 are represented by arrows with a solid outline and withdrawals of funds from control center 302 for distribution into an agent are represented by arrows with a dashed outline.

In the embodiment illustrated in FIG. 3A, bank 300A has a customer (depositor A) 304A who wants to deposit $1M and wants the deposit to be fully FDIC insured. Bank 300A is willing to accept reciprocal deposits from other network banks at the same rate plus related REDP program fees imposed by the owners of control center 302. Depositor 304A deposits the funds into an account at bank 300A, shown as deposit 306A, containing the text "$1M A" to indicate a deposit of $1M from depositor A. Depositor A 304A and bank 300A execute a REDP deposit network participating bank agreement.

Depositor A 304A and/or bank 300A as agent for Depositor A 304A registers for an REDP account, which may be, but is not limited to, an MMDA or NOW depending on the type of the depositor. The account so created is linked to control center 302.

Bank 300A, here the bank of origination, logs into control center 302 as agent for Depositor A 304A and posts a request for placement of reciprocal deposits and posts an interest rate (e.g., 50 bps) plus a fee imposed by control center 302 (e.g., 25-40 bps depending on current interest rate environment—for example purposes the fee is set at 40 bps) for placement of the funds at other REDP Banks who are seeking wholesale deposits ("Demand Banks") that would be exempt from the "brokered deposit adjustment" and have customers of their own (Depositors B-D) who would like to protect funds in excess of FDIC limits. The posted rate is fixed for a minimum of each calendar month. For example, the REDP rate may be set to 50 bps.

Banks 300B~D and their respective depositors 302B~D similarly deposit funds (shown as deposits 306B~D respectively), register for an REDP account, which is linked to control center 302, and post requests for placement of reciprocal deposits.

In the example illustrated in FIG. 3A, the pending transactions remain posted daily within control center 302 until a sufficient number of REDP network banks commit to accept up to $250,000 (actual amount is $245,000) of the funds at the posted rate plus fee to meet their own match funding needs for reciprocal deposits. Each network REDP bank sets its own interest rate to participate funds on behalf of its deposit customers. At this point the PAMAIF® model has validated the pending transactions through the allocation matrix of parameters, applied the appropriate business rules, reconciled the pending transactions against existing databases (i.e. bank holding reports), and the decision tree has solved transaction equations enabling a match of supply of REDP funds with demand for such REDP funds in real time.

In the example illustrated in FIG. 3A, $750K may be ACH debited from the accounts of each depositor 304A~D via their respective banks 300A~D by control center 302. The debited funds are then credited to banks 300A~D, which are receiving the wholesale funds in amounts less than the FDIC limit such that no bank receives funds that originated from its depositor. For example, the $1M in funds deposited by depositor A 304A are credited to banks 300B~D in equal amounts of $250K, shown as deposit 308 to bank 300B, deposit 310 to bank 300C, and deposit 312 to bank 300D. The remaining $250K of funds are deposited into bank 300A, indicated by the label "($250K A)" under bank 300A in FIG. 3A.

FIG. 3B illustrates the application of interest rates and fees to the banks and depositors participating in an exemplary reciprocal exchange deposit program according to one embodiment of the subject matter described herein. In the embodiment illustrated in FIG. 3B, participating banks 300A~D each set the interest rate to be paid to their respective depositors 304A~D. Control center 302 pays each bank the posted deposit rate R1 on a monthly basis according to the wholesale funding program. Control center 302 charges each participating bank that receives wholesale funds a wholesale funds rate that is usually above the deposit rate R1. In the example illustrated in FIG. 3B, control center 302 charge banks 300A~D a wholesale funding rate that is equal to the deposit rate R1 plus an additional 25~40 bps depending on the current interest rate environment for all wholesale funds received.

In the United States, the Final Rules require that the deposits be reciprocated, and that the banks set the rate. In the embodiment of the reciprocal exchange deposit program illustrated in FIG. 3B, control center 302 sets a deposit rate, R1, that each bank 300A~D must either choose to accept or seek funding elsewhere. Each bank 300A~D is at liberty to pass along this rate to their depositors or to extend a different rate to their depositors. Thus, in FIG. 3B, each bank 300A~D extends a depositor rate R1' to their respective depositors 304A~D respectively.

A bank may pay their depositor a lower rate than is paid to the bank by control center 302, i.e., R1'<R1, in which case the bank makes a profit on the interest earned by the depositor and which is paid out by control center 302. For example, R1 may be 30 basis points but R1' is 20 basis points, in which case the bank's spread is 10 basis points, which is profit for the bank.

A bank may also opt to pay their depositor a higher rate than is paid to the bank by control center 302, i.e., R1'>R1, when, for example, the bank wants to offer incentives to attract big depositors. If R1' does not equal R1, however, banks in the United States have the obligation to inform their depositor of this fact. A bank may also simply pass long the deposit rate to their depositors, in which case R1'=R1. In one embodiment, such as the ANOVA REDP program, control center 302 has no knowledge of whether R1 is the same or different from R1'.

In FIG. 3B, control center 302 also imposes a funding rate which banks 300A~D use to calculate interest payments to control center 302 for reciprocal funds received. This wholesale funding rate is usually some number of basis points higher than the deposit rate R1, which is indicated in FIG. 3B as solid arrows showing rates such as "R1+X", where X is a number of basis points. As shown in FIG. 3B, control center 302 is not required to impose the same wholesale funding rate to every participating bank 300A~D. For example, control center 302 imposes upon banks 300A and 300B a wholesale funding rate of "R1+X", while bank 300C is subject to a wholesale funding rate of "R1+Y", and bank 300D is subject to a wholesale funding rate of "R1+Z", where X, Y, and Z are different values.

FIG. 3C illustrates the income and expense for banks and depositors participating in an exemplary reciprocal exchange deposit program according to one embodiment of the subject matter described herein. REDP banks of origination earn the deposit rate R1 on behalf of their depositors. Demand banks pay the wholesale funding rate plus a fee to the program owner, represented in FIG. 3C by control center 302. For example, control center 302 may pay to each depositor 304A~D interest on their deposit, the interest totaling $312. Meanwhile, each demand bank may pay a wholesale funding fee of $562 to control center 302. Thus, control center 302 receives from each participant bank $250 more than it pays out to the depositor via that bank.

Figure 4A:
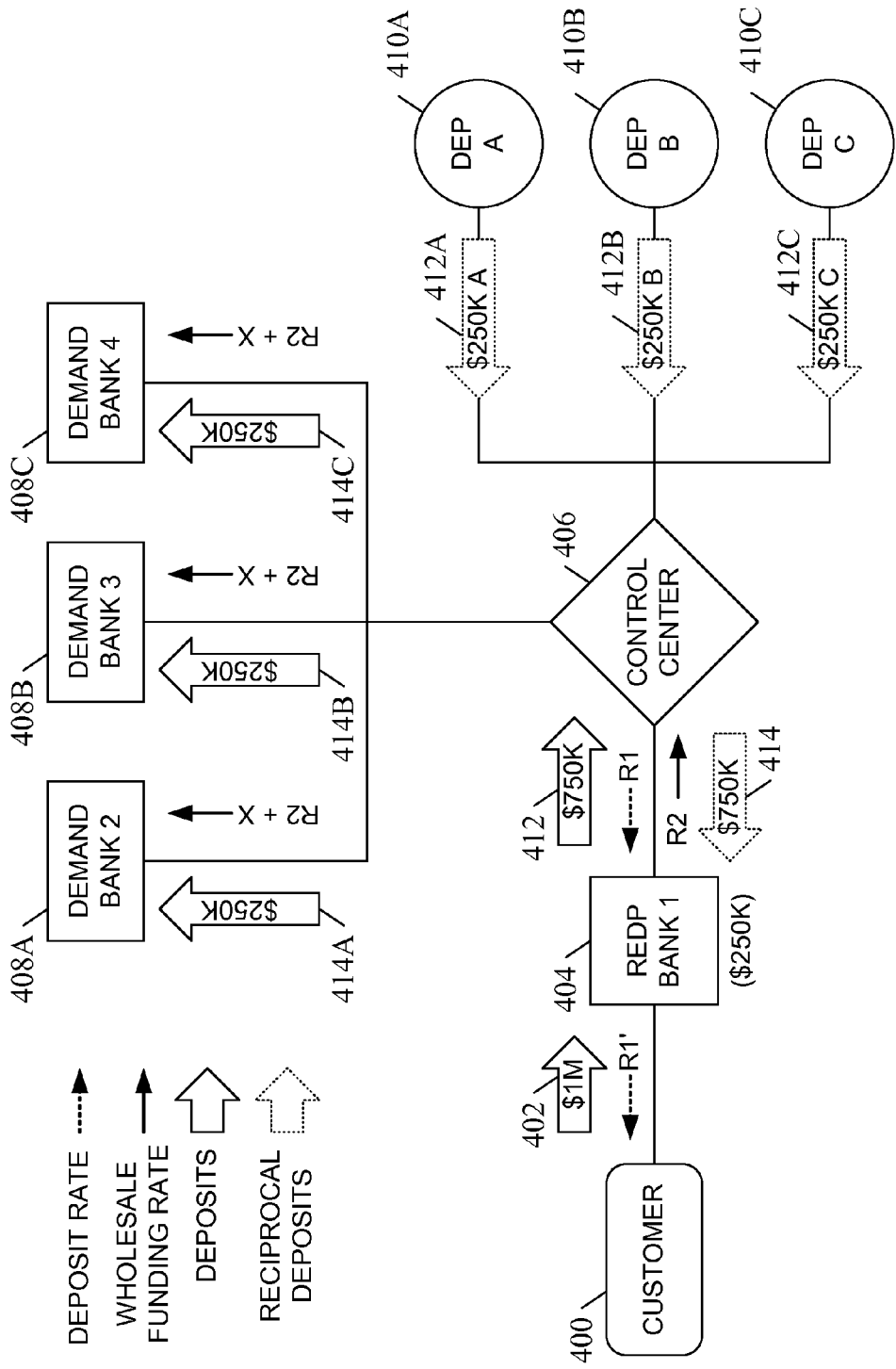
FIGS. 4A and 4B illustrate an exemplary system and method for facilitating the exchange of reciprocal deposits according to other embodiments of the subject matter described herein.
Figure 4B:
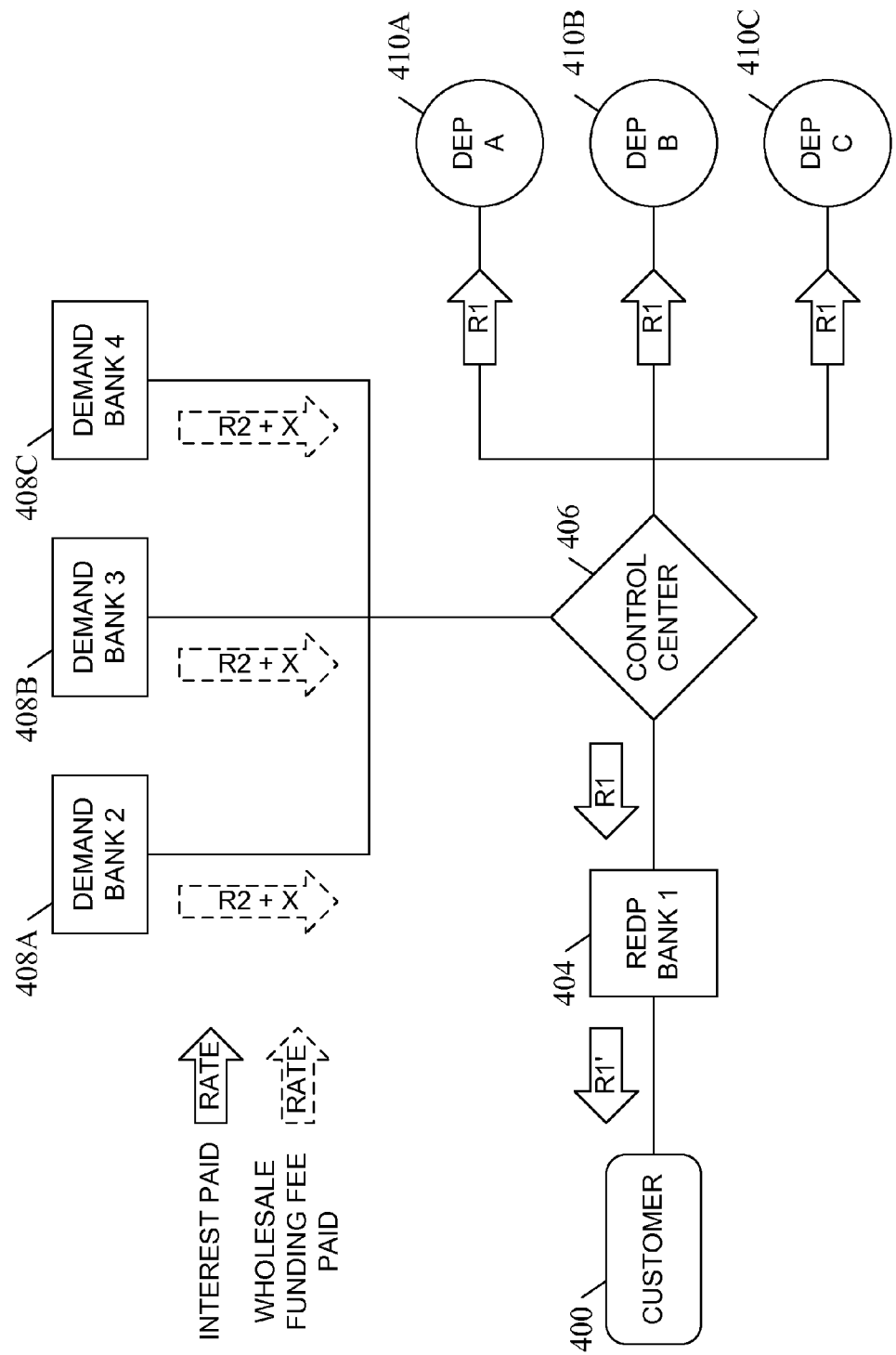

FIGS. 4A and 4B illustrate an exemplary system and method for facilitating the exchange of reciprocal deposits according to other embodiments of the subject matter described herein. FIGS. 4A-4C illustrate a system in which the entities that provide funds to the system may not be the same entities that receive funds from the system, herein referred to as an "open loop" model.

FIG. 4A illustrates a first portion of an exchange of reciprocal deposits in an exemplary reciprocal exchange deposit program according to another embodiment of the subject matter described herein. In the embodiment illustrated in FIG. 4A, customer 400 wants to make a deposit of $1M of funds (deposit 402) to participant bank 404, which here is the bank of origination. Customer 400 wants the $1M deposit to be fully insured. Bank 404 is willing to accept reciprocal deposits from other network banks at the same rate plus related REDP program fees imposed by the owners of control center 406. Customer 400 and bank 404 execute a REDP deposit network participating bank agreement. Customer 400 and/or bank 404 as agent for customer 400 registers for an REDP account, which is linked to control center 406.

Bank 404 logs into control center 406 as agent for customer 400 and posts a request for placement of reciprocal deposits and posts an interest rate (e.g., 50 bps) plus a fee imposed by control center 406 for placement of the funds at other REDP banks.

The pending transaction remains posted daily until sufficient demand banks, such as demand banks 408A~C, each commit to acceptance of up to $250,000 of the funds at the posted rate for wholesale funding and sufficient depositors 410A~C are available to provide reciprocal deposits to bank 404. Note that in the embodiment illustrated in FIGS. 4A-4C, demand banks 408A~C are not providing reciprocal deposits to REDP bank 404. Instead, the reciprocal deposits are originating from other depositors 410A~C who are not associated with demand banks 408A~C. REDP bank 404 sets the interest rate fixed monthly to participate funds on behalf of its deposit customers and demand banks 408A~C agree to accept this rate plus the program fee imposed by the owner of control center 406 as the interest to be paid monthly on the funds held. In one embodiment, the PAMAIF® model has validated the pending transactions through the allocation matrix of parameters, applied the appropriate business rules, reconciled the pending transactions against existing databases (i.e. bank holding reports), and the decision tree has solved transaction equations enabling a match of supply of REDP funds with demand for such funds in real time.

$750K is transferred from the account of customer 400 at REDP bank 404 to demand banks 408A~C who are receiving the wholesale funds in amounts less than the FDIC limit. For example, the $750K may be ACH debited or other transfer mechanism (shown as deposit 412), e.g., through control center 406 or through a custodian, and credited to the demand banks (shown as deposits 414A~C.) In one embodiment, REDP bank 404 sets the interest rate that will be charged to receive wholesale funding by demand banks 408A~C. In this example assume 50 bps. At this point, however, REDP bank 404 wants to be made whole. $750K has left the bank and they want $750K deposited back into the bank.

In the embodiment illustrated in FIG. 4A, the REDP program makes use of additional depositors 410A~C, who have accounts at other participating member banks who have posted funds for placement and matched the interest rate set by REDP bank 404. Each of depositors 410A~C supply $250K (shown as deposits 412A~C) to control center 406, which aggregates these deposits and provides it to REDP bank 404, shown as a deposit 414 of $750K. In this manner, REDP bank 404 has been made whole—$750K out (deposit 412) and $750K in (reciprocal deposit 414.) Note that in the embodiment illustrated in FIG. 4A, only bank 404 benefits from reciprocal deposits, since only bank 404 has been "made whole". Neither the demand banks 408A~C nor depositors 410A~C have participated in both halves of the reciprocal exchange: the banks received deposits but did not contribute reciprocal funds, and the depositors contributed deposits but did not receive reciprocal funds. Thus, only bank 404 will reap the regulatory benefit available under the Final Rule.

FIG. 4B illustrates an additional portion of an exchange of reciprocal deposits in an exemplary reciprocal exchange deposit program according to another embodiment of the subject matter described herein. In the embodiment illustrated in FIG. 4B, demand banks 408A~C pay the REDP wholesale funding fee, which may be the interest rate R1 set by REDP bank 404 plus an additional program fee X, shown in FIG. 4B as arrows with dashed outlines and containing text listing the rate at which the fee was paid. For example, in FIG. 4B, each of demand banks 408A~C pay a wholesale funding fee to control center 406 at a rate of "R2+X". The REDP program pays monthly to REDP bank 404 the interest earned on customer 400's deposits, shown in FIG. 4B as arrows with solid outlines and containing text listing the rate at which the interest was paid. The REDP program also pays monthly to depositors 410A~C the interest that they earned. For example, in FIG. 4B, control center 406 pays interest to bank 404 and depositors 410A~C at an interest rate of "R1". In this embodiment, control center 406 may earn a profit on the difference between the interest paid out and the wholesale funding fees received.

Figure 5:
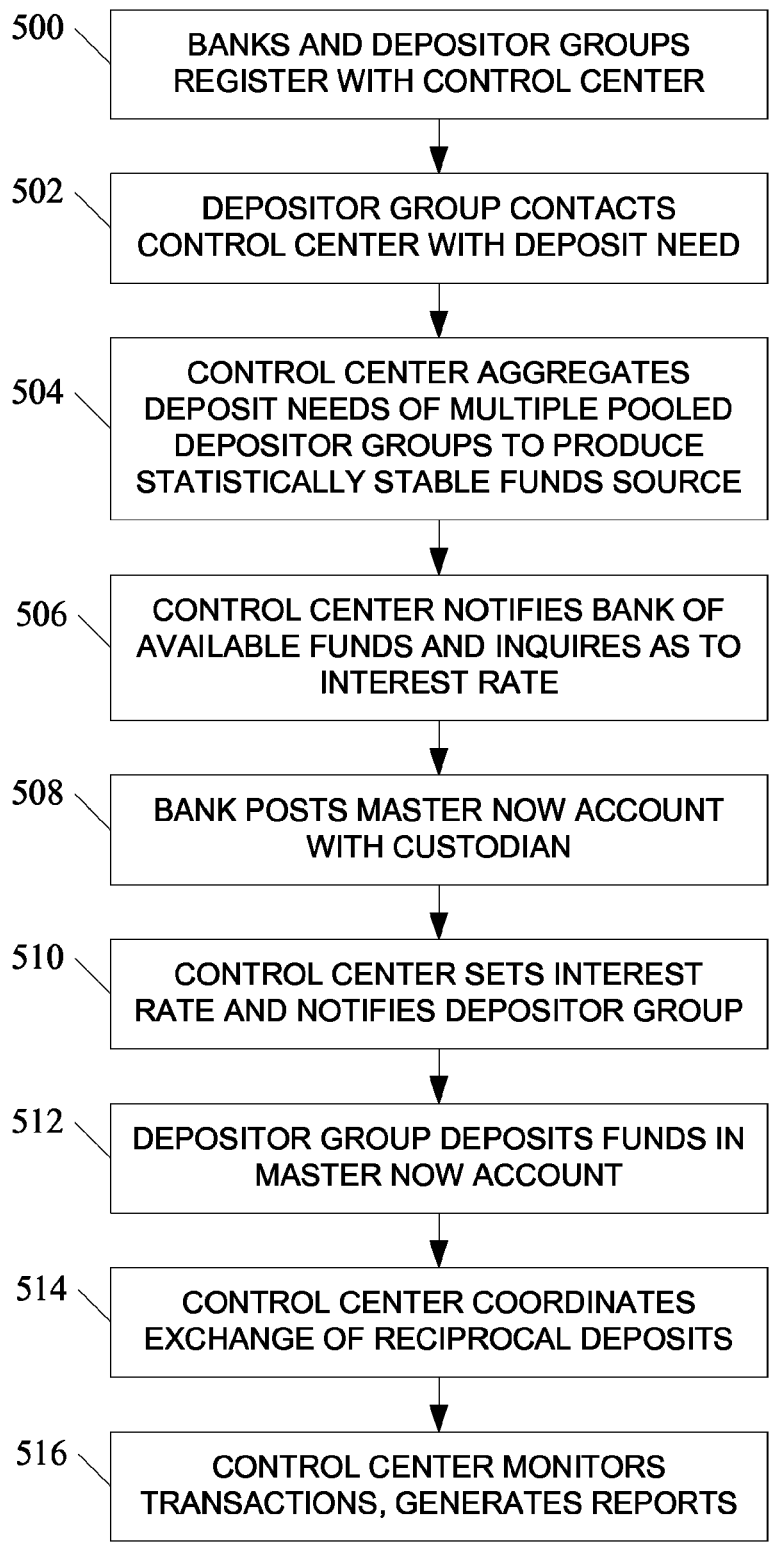
FIG. 5 is a flow chart illustrating exemplary steps that may be performed a system for facilitating the exchange of reciprocal deposits according to another embodiment of the subject matter described herein.

FIG. 5 is a flow chart illustrating exemplary steps that may be performed a system for facilitating the exchange of reciprocal deposits according to another embodiment of the subject matter described herein. This process will now be described with reference to FIGS. 1 and 5.

Referring to FIG. 5, at block 500, banks and depositor groups register with control center 106. For the banks, the registration may include qualifying as a commercial bank in accordance with predetermined standards, such as federal or state regulatory standards. For pooled depositor groups 100, registration may also include qualifying as an entity permitted to make deposits in a NOW account and guaranteeing a predetermined amount of deposit cash.

At block 502, after registration, a pooled depositor group 100 may contact control center 106 with a deposit need. For example, pooled depositor group 100 may indicate to control center 106 that depositor group 100 desires to deposit $10 million, wants a return of 2%, and desires for individual depositors to be able to access the money on a daily basis. Step 502 may occur multiple times as the operators of control center 106 determine available cash from different pooled depositor groups.

At block 504, control center 106 aggregates the deposit needs of multiple pooled depositor groups to produce a stable funds source. As discussed above, providing a stable funds source to commercial banks is important so that the commercial banks can consider the funds core deposits. At block 506, control center 106 notifies commercial banks of the amount of money available, and inquires as to the interest rate that the banks are willing to pay for the money. For example, a bank may agree to pay 235 basis points for $10 million, where basis point is equal to one one-hundredth of one percent. At block 508, banks 114 post master NOW accounts with custodian 108.

At block 510, control center 106 sets the interest rate to be paid to the pooled depositor group lower than rate that the bank is willing to pay and at or above the rate that the pooled depositor group expects and notifies the depositor group of the availability of a NOW account at the interest rate. Continuing with the example, if the depositor group expects 200 basis points, control center 106 may set the interest rate to be paid to the trust department to at least 200 basis points. Since the bank is willing to pay 235 basis points, control center 106 can generate up to 35 basis points in revenue.

At block 512, the depositor group deposits funds with custodian 108. Custodian 108 places the funds in one or more master NOW accounts in accordance with instructions from control center 106.

At block 514, control center 106 coordinate an exchange of reciprocal deposits, for example using the methods described above to find funds that have the same maturity and interest rate (and, optionally, having the same amount.)

At block 516, control center 106 manages transactions and generates reports to both the depositor group 100 and commercial banks 114. Managing transactions may include providing wiring instructions to depositor 100, custodian 108, and banks 114. In addition, managing transactions may include providing sub-accounting information to custodian 108 regarding individual depositors in a pooled depositor group so that individual depositors' deposits can be FDIC insured. Managing transactions may also include collecting interest paid by commercial banks 114 and distributing the interest to depositors. Yet another aspect of managing the transactions may include coordinating withdrawals made by depositors 100 in a manner that reduces transactions and wiring expenses. Two methods for coordinating withdrawals will be described in detail below.

Because the money is deposited in master NOW accounts, pooled depositor groups are allowed to withdraw funds without penalty on a daily basis. Thus, the invention provides an advantage to depositor groups over conventional certificates of deposit.

Although the example described above relates primarily to banks posting master NOW accounts, the subject matter described herein is not limited to using master NOW accounts. For example, corporations are not permitted to deposit money in master NOW accounts. Accordingly, receiving money from corporations and having commercial banks post accounts that are equivalent to master NOW accounts in which corporations are permitted to deposit cash is intended to be within the scope of the invention. In one exemplary implementation, in order to receive deposits from corporations, the subject matter described herein may include using a money market deposit account (MMDA) account. Thus, although the examples described herein relate to master NOW accounts, it is understood that MMDA accounts may be used without departing from the scope of the invention.

In one exemplary implementation, a system for facilitating transactions between commercial banks and pooled depositor groups may be implemented using a web server that provides the interfaces illustrated in FIG. 1. Such a web server may be implemented using any suitable commercially available web server platform, such as an Apache web server. Each interface illustrated in FIG. 1 may be implemented as an application capable of executing on such a platform.

It will be understood that various details of the subject matter described herein may be changed without departing from the scope of the subject matter described herein. Furthermore, the foregoing description is for the purpose of illustration only, and not for the purpose of limitation.

What is claimed is:

1. A system for facilitating the exchange of reciprocal deposits, the system comprising:
    a first bank for participating in an exchange of reciprocal deposits; and
    a control center for implementing an exchange of reciprocal deposits between the first bank and a second bank for receiving deposits, wherein the control center is configured to:
        receive, from the first bank, a first request for placement of reciprocal deposits, the request defining a first set of requirements;
        receive, from the second bank, a second request for placement of reciprocal deposits, the request defining a second set of requirements;
        determine whether the first set of requirements matches the second set of requirements; and
        in response to determining that the first set of requirements matches the second set of requirements, perform an exchange of on-balance sheet deposits meeting the first set of requirements from the first bank to off-balance sheet deposits to the second bank, and receive at the first bank reciprocal deposits meeting the second set of requirements as new on-balance sheet deposits, wherein each of the first and second set of requirements includes a maturity and an interest rate.

2. The system of claim 1 wherein each of the first and second set of requirements further includes an amount of deposit.

3. The system of claim 1 wherein the reciprocal deposits received at the first bank are provided by the second bank.

4. The system of claim 1 wherein the reciprocal deposits received at the first bank are provided by an entity other than the first and second banks.

5. The system of claim 4 wherein the entity other than the first and second banks comprises at least one of a third bank and a depositor.

6. The system of claim 1 further comprising:
a depositor interface for allowing depositor groups to post deposit needs;
a control center interface for allowing a control center to view the deposit needs, to aggregate the deposit needs of multiple depositor groups, to set an interest rate to be paid to the depositor groups for access to the stable funds source, to set an interest rate to be paid by commercial banks for access to funds in the stable funds source and to notify the depositor groups of the interest rate to be paid to the depositor groups and commercial banks of the interest rate to be paid by the commercial banks; and
a commercial banks interface for allowing the commercial banks to post for receiving funds from the stable funds source, wherein the pooled depositor groups deposit funds in the accounts and the commercial banks provide access to the funds in the accounts on a demand basis without penalty.

7. A method for facilitating the exchange of reciprocal deposits, the method comprising:
at a control center having at least one computer:
receiving, from a first bank of origination, a first request for placement of reciprocal deposits, the request defining a first set of requirements;
receiving, from a second bank of origination, a second request for placement of reciprocal deposits, the request defining a second set of requirements;
determining whether the first set of requirements matches the second set of requirements; and
in response to determining that the first set of requirements matches the second set of requirements, performing an exchange of on-balance sheet deposits meeting the first set of requirements from the first bank of origination to off-balance sheet deposits to the second bank of origination, and receiving at the first bank of origination reciprocal deposits meeting the second set of requirements as new on-balance sheet deposits, wherein each of the first and second set of requirements includes a maturity and an interest rate.

8. The method of claim 7 wherein each of the first and second set of requirements further includes an amount of deposit.

9. The method of claim 7 further comprising:
determining deposit needs of a plurality of depositor groups; aggregating the deposit needs of the depositor groups to provide a stable funds source;
notifying commercial banks of the availability of the stable funds source and an amount of funds available in the stable funds source;
setting an interest rate to be paid to the depositor groups to a predetermined value based on an interest rate that the commercial banks are willing to pay for the stable funds source and an interest rate the depositor groups expect as a return for use of funds in the stable funds source;
receiving account postings from the commercial banks;
depositing funds from the stable funds source in the accounts; and
allowing the depositor groups to withdraw funds from the accounts on a demand basis without penalty.

10. The method of claim 9 wherein determining deposit needs of a plurality of depositor groups includes determining deposit needs of trust departments at commercial banks and wherein aggregating the deposit needs includes aggregating funds from the trust departments at multiple different commercial banks.

11. The method of claim 9 wherein determining deposit needs of a plurality of depositor groups includes determining deposit needs of different municipalities and wherein aggregating the deposit needs includes aggregating funds from the municipalities.

12. The method of claim 9 wherein determining deposit needs of a plurality of depositor groups includes determining deposit needs of different pension funds and wherein aggregating the deposit needs includes aggregating funds from the pension funds.

13. The method of claim 9 wherein determining deposit needs of a plurality of depositor groups includes determining deposit needs of different corporations and wherein aggregating the deposit needs includes aggregating funds from the corporations.

14. The method of claim 9 wherein notifying commercial banks of the availability of the stable funds source includes posting an amount of funds available and the interest rate on a website accessible by the commercial banks.

15. The method of claim 9 wherein notifying the commercial banks of the availability of the stable funds source includes automatically emailing the commercial banks of the amount of funds available and the interest rate at which the funds are available.

16. The method of claim 9 wherein setting the interest rate to be paid to the depositor groups to a predetermined value includes setting the interest rate to a value below the interest rate that the commercial banks are willing to pay for the funds.

17. The method of claim 9 wherein setting the interest rate to be paid to the depositor groups to a predetermined value includes setting the interest rate to a value equal to the interest rate that the commercial banks are willing to pay for the funds.

18. The method of claim 9 wherein receiving account postings and depositing funds in the accounts includes establishing a custodian to manage cash flow into and from the accounts.

19. The method of claim 9 wherein allowing the depositor groups to withdraw funds on a demand basis includes providing a web interface for the depositor groups to access funds in one dollar dominations on a daily basis without penalty.

20. The method of claim 9 comprising receiving incoming deposits and withdrawal requests from the depositor groups, satisfying the incoming withdrawal requests using the incoming deposits, and updating account records to change ownership of deposited funds without withdrawing funds from the commercial banks.

21. The method of claim 9 wherein at least some of the steps of the method are implemented on a web server accessible to the commercial banks and the pooled depositor groups via secure web interfaces.

22. The method of claim 9 wherein depositing funds in the accounts includes depositing funds in excess of a federal deposit insurance limit from a single depositor group in a master NOW account of a single commercial bank and providing federal deposit insurance or a collateral for the entire deposit.

23. The method of claim 9 wherein the commercial banks report the funds deposited in the accounts as stable and/or reciprocal deposits.

24. The method of claim 9 wherein the depositor groups comprise pooled depositor groups and wherein the accounts comprise master negotiated order of withdrawal accounts.

25. The method of claim 7 further comprising:
receiving deposit account postings from a plurality of different commercial banks;
determining a deposit need of at least one depositor; and
matching the deposit need with the deposit account postings in a manner that provides deposit insurance for funds deposited by the depositor.

26. The method of claim 25 wherein the depositor comprises an individual entity.

27. The method of claim 25 wherein the individual entity comprises a human being.

28. The method of claim 25 wherein the individual entity comprises a corporation.

29. The method of claim 25 wherein matching the deposit need with the deposit account posting includes auctioning available deposits to the commercial banks.

30. A non-transitory computer readable medium having stored thereon executable instructions that when executed by the processor of a computer control the computer to perform steps comprising:
receiving, from a first bank of origination, a first request for placement of reciprocal deposits, the request defining a first set of requirements;
receiving, from a second bank of origination, a second request for placement of reciprocal deposits, the request defining a second set of requirements;
determining whether the first set of requirements matches the second set of requirements;
in response to determining that the first set of requirements matches the second set of requirements, performing an exchange of on-balance sheet deposits meeting the first set of requirements from the first bank of origination to off-balance sheet deposits to the second bank of origination, and receiving at the first bank of origination reciprocal deposits meeting the second set of requirements as new on-balance sheet deposits, wherein each of the first and second set of requirements includes a maturity and an interest rate.

31. The non-transitory computer readable medium of claim 30 wherein each of the first and second set of requirements further includes an amount of deposit.

32. The non-transitory computer readable medium of claim 30 having stored thereon executable instructions that when executed by the processor of a computer control the computer to perform steps comprising:
determining deposit needs of a plurality of depositor groups;
aggregating the deposit needs of the depositor groups to provide a stable funds source;
notifying commercial banks of the availability of the stable funds source and an amount of funds available in the stable funds source;
setting an interest rate to be paid to the depositor groups to a predetermined value based on an interest rate that the commercial banks are willing to pay for the stable funds source and an interest rate the depositor groups expect as a return for use of funds in the stable funds source;
receiving account postings from the commercial banks;
depositing funds from the stable funds source in the accounts; and
allowing depositor groups to withdraw funds from the accounts on a demand basis without penalty.

* * * * *